US010891541B2

(12) United States Patent
Yu et al.

(10) Patent No.: US 10,891,541 B2
(45) Date of Patent: Jan. 12, 2021

(54) DEVICES, SYSTEMS, AND METHODS FOR FEATURE ENCODING

(71) Applicant: CANON KABUSHIKI KAISHA, Tokyo (JP)

(72) Inventors: Jie Yu, Santa Clara, CA (US); Francisco Imai, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 15/492,944

(22) Filed: Apr. 20, 2017

(65) Prior Publication Data

US 2017/0330068 A1    Nov. 16, 2017

Related U.S. Application Data

(60) Provisional application No. 62/337,040, filed on May 16, 2016.

(51) Int. Cl.
    *G06N 3/04*     (2006.01)
    *G06N 3/08*     (2006.01)
    *G06K 9/62*     (2006.01)

(52) U.S. Cl.
    CPC ........... *G06N 3/0454* (2013.01); *G06K 9/629* (2013.01); *G06K 9/6274* (2013.01); *G06N 3/084* (2013.01)

(58) Field of Classification Search
    CPC ...... G06N 3/0454; G06N 3/084; G06K 9/629; G06K 9/6274
    See application file for complete search history.

(56) References Cited

U.S. PATENT DOCUMENTS

| 10,014,076 B1 * | 7/2018 | LaBorde | G06N 3/088 |
| 2015/0347859 A1 * | 12/2015 | Dixon | G06K 9/186 |
| | | | 382/138 |
| 2015/0347861 A1 * | 12/2015 | Doepke | H04N 5/23245 |
| | | | 382/199 |

(Continued)

OTHER PUBLICATIONS

Junhua Mao, "Explain Images with Multimodal Recurrent Neural Networks", Oct. 4, 2014, 1-9 (Year: 2014).*

(Continued)

*Primary Examiner* — Kamran Afshar
*Assistant Examiner* — Imad Kassim
(74) *Attorney, Agent, or Firm* — Canon U.S.A., Inc. IP Division

(57) ABSTRACT

Devices, systems, and methods obtain data in a first modality; propagate the data in the first modality through a neural network, thereby generating network outputs, wherein the neural network includes a first-stage neural network and a second-stage neural network, wherein the first-stage neural network includes two or more layers, wherein each layer of the two or more layers of the first-stage neural network includes a plurality of respective nodes, wherein the second-stage neural network includes two or more layers, one of which is an input layer and one of which is an output layer, and wherein each node in each layer of the first-stage neural network is connected to the input layer of the second-stage neural network; calculate a gradient of a loss function based on the network outputs; backpropagate the gradient through the neural network; and update the neural network based on the backpropagation of the gradient.

18 Claims, 12 Drawing Sheets

(56) References Cited

U.S. PATENT DOCUMENTS

| | | | | |
|---|---|---|---|---|
| 2016/0174902 | A1* | 6/2016 | Georgescu | G06T 7/73 600/408 |
| 2016/0180183 | A1* | 6/2016 | Bourdev | G06K 9/00335 382/115 |
| 2016/0284347 | A1* | 9/2016 | Sainath | G06N 3/0445 |
| 2017/0098153 | A1* | 4/2017 | Mao | G06N 3/0445 |
| 2017/0293638 | A1* | 10/2017 | He | G06F 16/5846 |

OTHER PUBLICATIONS

Junhua Mao, "Deep Captioning With Multimodal Recurrent Neural Networks (M-RNN)", Jun. 11, 2015, 1-17 (Year: 2015).*

Jeff Donahue et al., Long-term Recurrent Convolutional Networks for Visual Recognition and Description, CVPR 2015, Jun. 2015.

Bharath Hariharan et al., Hypercolumns for Object Segmentation and Fine-grained Localization, CVPR 2015, Jun. 2015.

Andrej Karpathy et al., Deep Visual-Semantic Alignments for Generating Image Descriptions, Jun. 2015.

Ryan Kiros et al., Multimodal Neural Language Models, Proceedings of the 31st International Conference on Machine Learning, Jun. 2014.

Ryan Kiros et al., Unifying Visual-Semantic Embeddings with Multimodal Neural Language Models, Nov. 2014.

Yu Kong et al., Bilinear Heterogeneous Information Machine for RGB-D Action Recognition, CVPR 2015, Jun. 2015.

Chi Li et al., Beyond Spatial Pooling: Fine-Grained Representation Learning in Multiple Domains, CVPR 2015, Jun. 2015.

Lingqiao Liu et al., The Treasure beneath Convolutional Layers: Cross-convolutional-layer Pooling for Image Classification, CVPR 2015, Jun. 2015.

Lin Ma et al., Multimodal Convolutional Neural Networks for Matching Image and Sentence, Apr. 2015.

Aditya Krishna Menon et al., Cross-Modal Retrieval: A Pairwise Classification Approach, Apr. 2015.

Jiquan Ngiam et al., Multimodal Deep Learning, Proceedings of the 28th International Conference on Machine Learning, Jun. 2011.

Anh Nguyen et al., Deep Neural Networks are Easily Fooled: High Confidence Predictions for Unrecognizable Images, CVPR 2015, Jun. 2015.

Abhishek Sharma et al., Deep Hierarchical Parsing for Semantic Segmentation, CVPR 2015, Jun. 2015.

Suraj Srinivas et al., A Taxonomy of Deep Convolutional Neural Nets for Computer Vision, Jan. 2016.

Li Wan et al., End-to-End Integration of a Convolutional Network, Deformable Parts Model and Non-Maximum Suppression, CVPR 2015, Jun. 2015.

Xiaolong Wang et al., Designing Deep Networks for Surface Normal Estimation, CVPR 2015, Jun. 2015.

Yuting Zhang et al., Improving Object Detection with Deep Convolutional Networks via Bayesian Optimization and Structured Prediction, CVPR 2015, Jun. 2015.

* cited by examiner

DEVICES, SYSTEMS, AND METHODS FOR FEATURE ENCODING

CROSS-REFERENCE TO RELATED APPLICATIONS

This application claims the benefit of U.S. provisional Application No. 62/337,040, which was filed on May 16, 2016.

BACKGROUND

Technical Field

This description generally relates to visual-feature encoding.

Background

Various methods exist for extracting features from images. Examples of feature-detection algorithms include scale-invariant feature transform (SIFT), difference of Gaussians, maximally stable external regions, histogram of oriented gradients, gradient location and orientation histogram, and smallest univalue segment assimilating nucleus. Also, images may be converted to representations. A representation is often more compact than an entire image, and comparing representations is often easier than comparing entire images. Representations can describe various image features, for example SIFT features, speeded up robust features (SURF features), local binary patterns (LBP) features, color histogram (GIST) features, and histogram of oriented gradients (HOG) features. Representations include, for example, Fisher vectors and bag-of-visual-words (BOW) features.

SUMMARY

Some embodiments of a device comprise one or more computer-readable media and one or more processors that are coupled to the one or more computer-readable media. The one or more processors are configured to cause the device to obtain data in a first modality; propagate the data in the first modality through a first neural network, thereby generating first network outputs; calculate a gradient of a loss function based on the first network outputs and on the loss function; backpropagate the gradient of the loss function through the first neural network; and update the first neural network based on the backpropagation of the gradient. Additionally, the first neural network includes a first-stage neural network and a second-stage neural network; the first-stage neural network includes two or more layers; each layer of the two or more layers of the first-stage neural network includes a plurality of respective nodes; the second-stage neural network includes two or more layers, one of which is an input layer and one of which is an output layer; each node in each layer of the first-stage neural network is connected to the input layer of the second-stage neural network; and the output layer of the second-stage neural network produces the first network outputs.

Some embodiments of one or more computer-readable storage media store computer-executable instructions that, when executed by one or more computing devices, cause the one or more computing devices to perform operations that comprise obtaining data in a first modality; propagating the data in the first modality through a first neural network, thereby generating first network outputs; calculating a gradient of a loss function based on the first network outputs and on the loss function; backpropagating the gradient of the loss function through the first neural network; and updating the first neural network based on the backpropagation of the gradient. Also, the first neural network includes a first-stage neural network and a second-stage neural network; the first-stage neural network includes two or more layers, one of which is an input layer and one of which is a deepest layer; the second-stage neural network includes two or more layers, one of which is an input layer and one of which is a deepest layer; and the input layer of the second-stage neural network is fully connected to the first-stage neural network.

Some embodiments of a method comprise obtaining data in a first modality; propagating the data in the first modality through a first neural network, thereby generating first network outputs; calculating a gradient of a loss function based on the first network outputs and on the loss function; backpropagating the gradient of the loss function through the first neural network; and updating the first neural network based on the backpropagation of the gradient. And the first neural network includes a first-stage neural network and a second-stage neural network; the first-stage neural network includes two or more layers; each layer of the two or more layers of the first-stage neural network includes a plurality of respective nodes; the second-stage neural network includes two or more layers, one of which is an input layer and one of which is an output layer; each node in each layer of the first-stage neural network is connected to the input layer of the second-stage neural network; and the output layer of the second-stage neural network produces the first network outputs.

Some embodiments of systems, devices, and methods for training a neural network generate a neural network that is end-to-end trainable; that can use all of its layers; that can perform supervised, unsupervised, or semi-supervised learning; and that can use both paired modalities of data and non-paired modalities of data.

DESCRIPTION

The following paragraphs describe explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
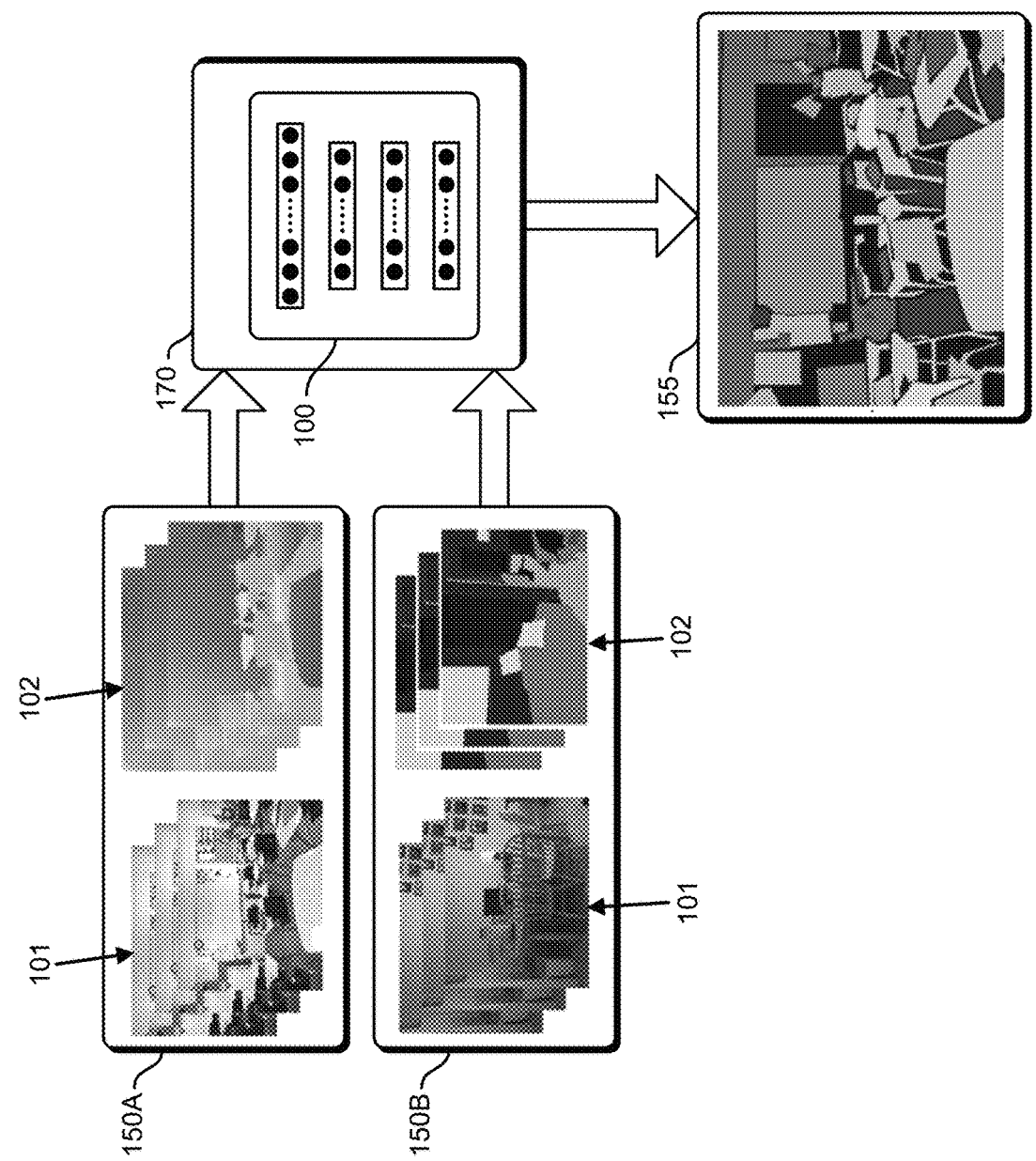
FIG. 1 illustrates the flow of information in an example embodiment of a system for feature encoding.

FIG. 1 illustrates the flow of information in an example embodiment of a system for feature encoding. The system includes a specially-configured computing device 170 that implements a neural network 100 that accepts multiple modalities of data 150A-B as inputs and that performs detection, segmentation, or classification. Examples of data modalities include RGB images, RGB videos, text from annotations and sentences, depth maps, hyperspectral images, and polarization information. In FIG. 1, the data 150A-B have two modalities: RGB images 101 and depth maps 102. Also, the different modalities of data may be paired or unpaired. When the modalities are paired, the data of the different modalities depict the same scene, object, action, or event. For example, the modalities of the first data 150A are paired because the data of the modalities (the RGB image 101 and the depth map 102 in FIG. 1) show the same scene. When the modalities are unpaired, the data of the multiple modalities depict different scenes, objects, actions, or events. For example, the modalities in the second data 150B are unpaired because the data of the modalities (the RGB image 101 and the depth map 102 in FIG. 1) depict different scenes.

The computing device 170 obtains and stores the data 150A-B, and then the computing device 170 uses the data 150A-B to train the neural network 100. Once the neural network 100 is trained, the computing device 170 can use the neural network 100, for example for image segmentation, object detection, and object classification. In FIG. 1, the computing device 170 uses the trained neural network 100 to segment the scene that is depicted in the first data 150A and outputs the segmentation results 155.

Figure 2:
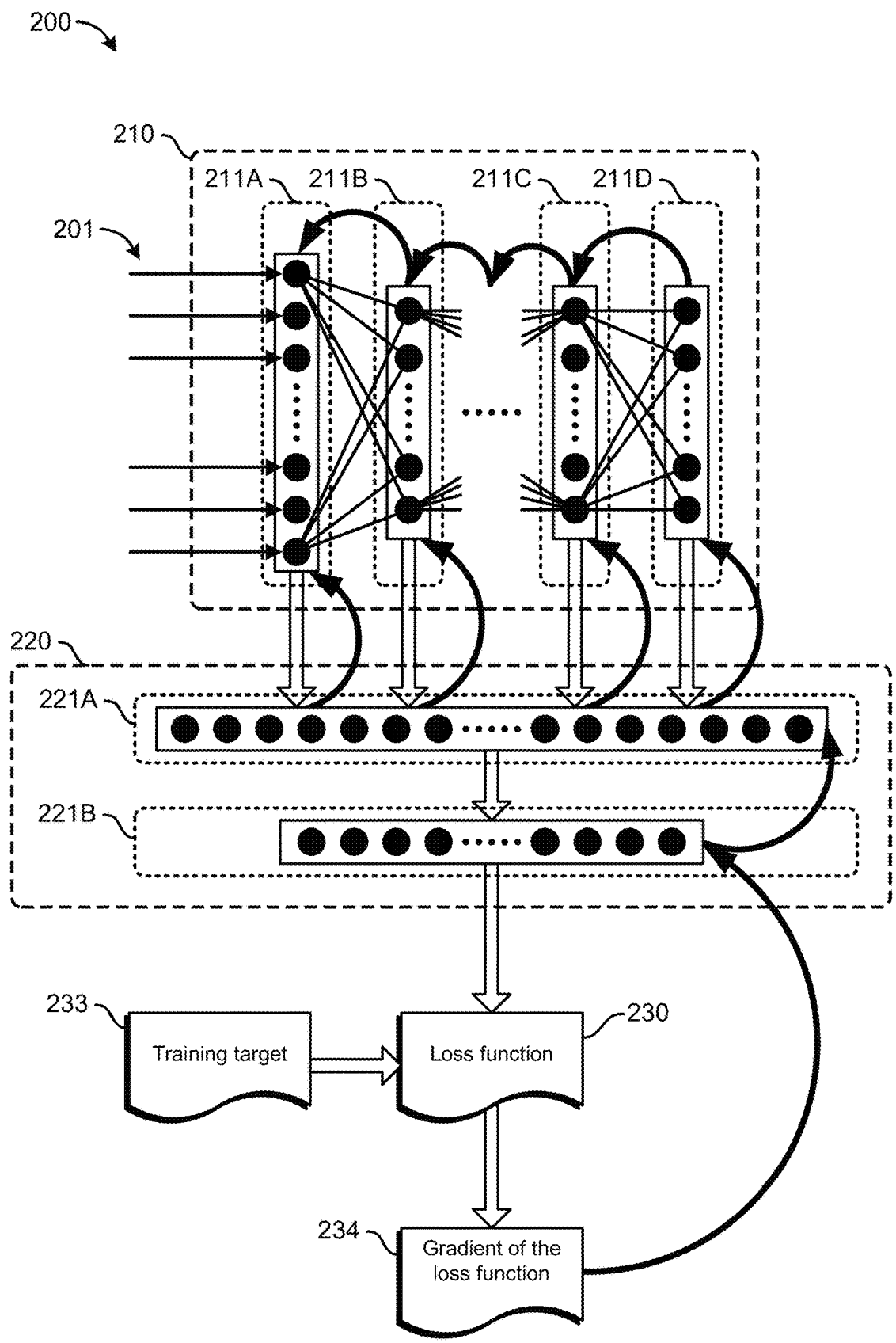
FIG. 2 illustrates an example embodiment of a neural network.

FIG. 2 illustrates an example embodiment of a neural network 200. The neural network 200 includes a first-stage neural network 210 (e.g., a deep neural network, an auto-encoder, a convolutional neural network, a recurrent neural network, a de-convolutional neural network) and a second-stage neural network (SSNN) 220. This embodiment of a SSNN 220 includes a fully-connected first layer 221A, which is fully-connected to all of the nodes in the first-stage neural network 210, and includes a second layer 221B. Also, each node in the fully-connected first layer 221A is connected to every node in the first-stage neural network 210 (for a figure that shows all of the connections, see FIG. 11). Accordingly, in this embodiment the fully-connected layer 221A is constructed from all of the node values of all of the layers 211 of the first-stage neural network 210. Thus, the outputs of the first-stage neural network 210 can include the node value of any node in any layer 211.

To train the neural network 200, some embodiments use a loss function L (e.g., a reconstruction error, and a classification error) that can be described by the following:

$$\min L(f(W,X),Y), \qquad (1)$$

where $f$ is the function that is defined by a neural network that has parameters W, and where X and Y are the inputs and ground-truth information, respectively.

Because the inputs to the second-stage neural network 220 may have a very high dimensionality, some embodiments use sparsity constraints to limit the number of non-zero weights that connect the first-stage neural network 210 to the first layer 221A of the second-stage neural network 220, for example as described by the following:

$$\min(L(f(W,X),Y)+\lambda|W_{TEN}|), \qquad (2)$$

where $W_{TEN}$ is the parameters of a layer of the second-stage neural network, and where $W_{TEN}$ is also a subset of W. Also, some embodiments similarly limit the number of non-zero weights between the layers 221 of the second-stage neural network 220 (e.g., between the first layer 221A and the second layer 221B). And in some embodiments, the weights of the non-zero nodes are all represented by "1"; thus a weight can be only "1" or, alternatively, "0."

The sparse weights that are learned using the sparsity constraint may have at least the following two advantages: (1) they may optimally integrate outputs from different layers, and (2) they may avoid overfitting introduced by the large number of inputs to the second-stage neural network 220.

Additionally, the manual selection of outputs from certain layers 211 of the first-stage neural network can be deemed as a special case of a SSNN 220. The outputs may be selected nodes in the SSNN 220, the selected outputs may be represented by non-zero weights of the nodes in the SSNN 220, and the non-selected outputs may be represented by zero weights of the nodes.

Moreover, some embodiments initialize the weights of a SSNN 220 with manually-set parameters based on domain knowledge. And a training process can further optimize the parameters (e.g., weights, maximum number of non-zero weights between two layers) of the SSNN 220, thereby using training data to achieve better performance.

When training the neural network 200 using backpropagation (e.g., with gradient descent), the gradient 234 of a loss function 230 can be calculated based on the output layer (the second layer 211B of the SSNN 220, in this example) and a training target 233, and then the gradient 234 can be backpropagated through the neural network 200. In this embodiment, the gradient 234 is backpropagated to the second layer 221B of the SSNN 220, then from the second layer 221B of the SSNN 220 to the first layer 221A of the SSNN 220. The backpropagation then continues from the nodes of the first layer 221A of the SSNN 220 to the nodes of the first-stage neural network 210. Next, the backpropagation continues from the last layer 211 (the fourth layer 211D in this example) of the first-stage neural network 210, through the other layers 211 (the third layer 211C and the second layer 211B in this example), to the first layer 211A. Then the nodes in the first-stage neural network 210 and the SSNN 220 are updated based on the backpropagated gradient. Thus, the backpropagation passes through some nodes more than once, for example the nodes in the third layer 211C and the second layer 211B.

Figure 3:
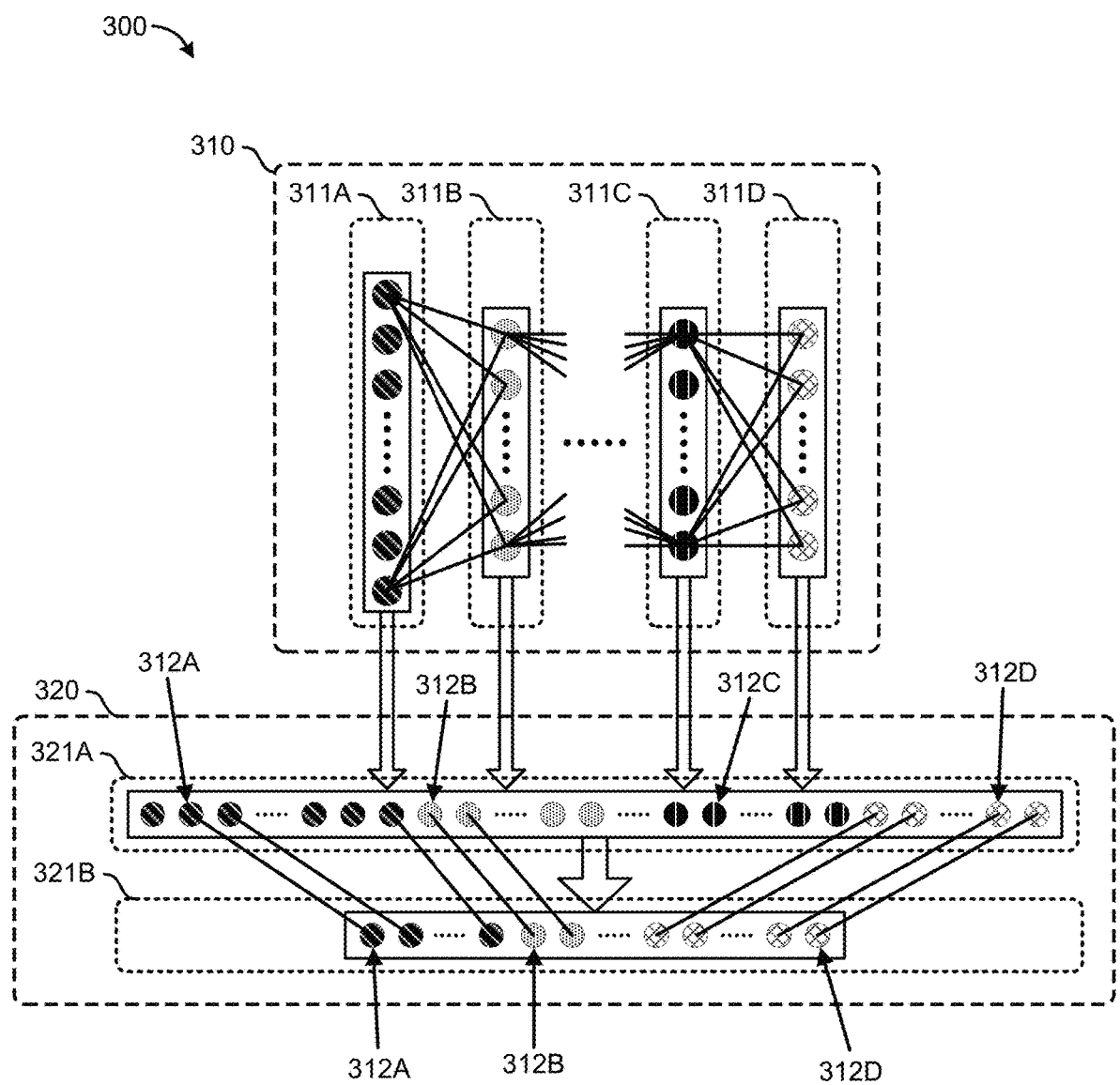
FIG. 3 illustrates an example embodiment of a neural network.

FIG. 3 illustrates an example embodiment of a neural network 300. FIG. 3 highlights specific nodes in the neural network 300 to show the relationships between the nodes. This example embodiment enforces a sparsity constraint. In this embodiment, each node in the first layer 321A of the second-stage neural network 320 (SSNN 310) has a connection that has a weight of "1" with only one node in the first-stage neural network 310; the weights of all other connections with the other nodes in the first-stage neural network 310 are "0."

The first layer 321A of the SSNN 320 includes first-layer nodes 312A, which are nodes that have a connection with a weight of "1" with a node in the first layer 311A of the first-stage neural network 310. One of the first-layer nodes 312A is labeled 312A in FIG. 3 and the other first-layer nodes 312A that have a respective connection with a weight of "1" with a node in the first layer 311A of the first-stage neural network 310 have the same shading as the labeled first-layer node 312A. Likewise, the first layer 321A of the second-stage neural network 320 includes second-layer nodes 312B, third-layer nodes 312C, and fourth-layer nodes 312D. Also, some of the second-layer nodes 312B, third-layer nodes 312C, and fourth-layer nodes 312D are labeled in FIG. 3, and the other second-layer nodes 312B, third-layer nodes 312C, and fourth-layer nodes 312D have the same shading as the labeled nodes.

Because sparsity constraints limit the number of non-zero weights in the SSNN 320 between the first layer 321A and the second layer 321B, and because the weights are either "1" or "0" in this example, the second layer 321B does not include all of the nodes of the first layer 321A. For example, in the embodiment shown in FIG. 3, the second layer 321B includes some of the first-layer nodes 312A, some of the second-layer nodes 312B, none of the third-layer nodes 312C, and all of the fourth-layer nodes 312D. In some embodiments, the non-zero weights have a value other than "1."

Figure 4:
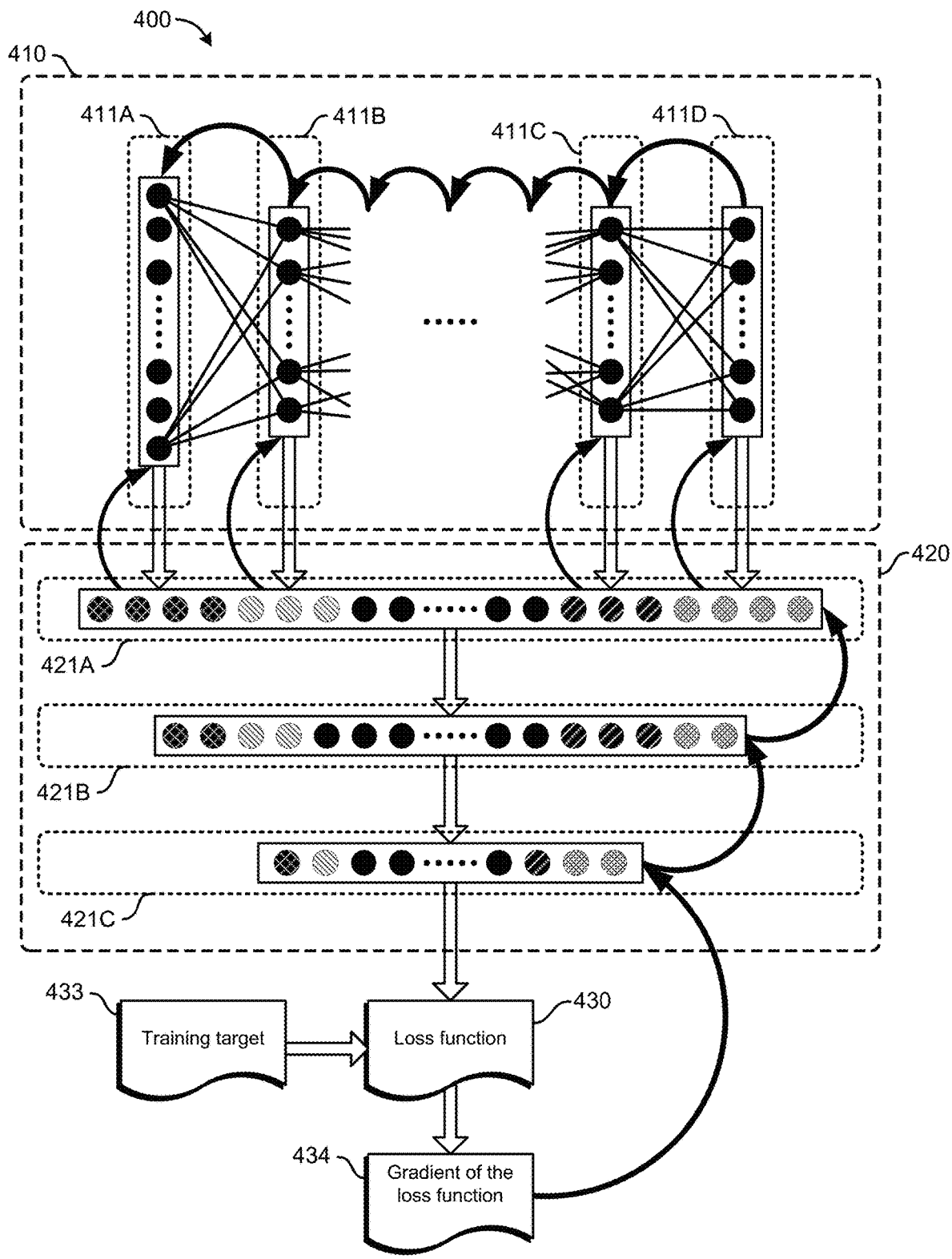
FIG. 4 illustrates an example embodiment of a neural network.

FIG. 4 illustrates an example embodiment of a neural network 400. The neural network 400 includes a first-stage neural network 410 and a SSNN 420. In this embodiment, the first-stage neural network 410 includes four or more layers (the layers are fully connected, even though some of the connections are omitted to simplify the figure), and the SSNN 420 includes three layers 421: a first layer 421A, a second layer 421B, and a third layer 421C. This embodiment imposes a sparsity constraint between the three layers 421 of the SSNN 420. Also, some other embodiments of the SSNN 420 include more or fewer layers. All of the nodes in the first-stage neural network 410 are each connected to all of the nodes in the first layer 421A of the SSNN 420.

When training the neural network 400 using backpropagation, the gradient 434 of a loss function 430 can be calculated based on the output layer (the third layer 411C of the SSNN 420, in this example) and a training target 433 (e.g., the goal that the output layer is being trained to match), and then the gradient 434 can be backpropagated through the neural network 400. In this embodiment, the gradient 434 is backpropagated to the third layer 421C of the SSNN 420, then from the third layer 421C to the second layer 421B, then from the second layer 421B to the first layer 421A. The backpropagation then continues from the nodes of the first layer 421A of the SSNN 420 to the nodes of the first-stage neural network 410. Next, the backpropagation continues from the last layer 411 (the fourth layer 411D in this example) of the first-stage neural network 410, through the other layers 411 (including the third layer 411C and the second layer 411B, in this example), to the first layer 411A. Then the nodes in the first-stage neural network 410 and the SSNN 420 are updated based on the backpropagated gradient.

Figure 5A:
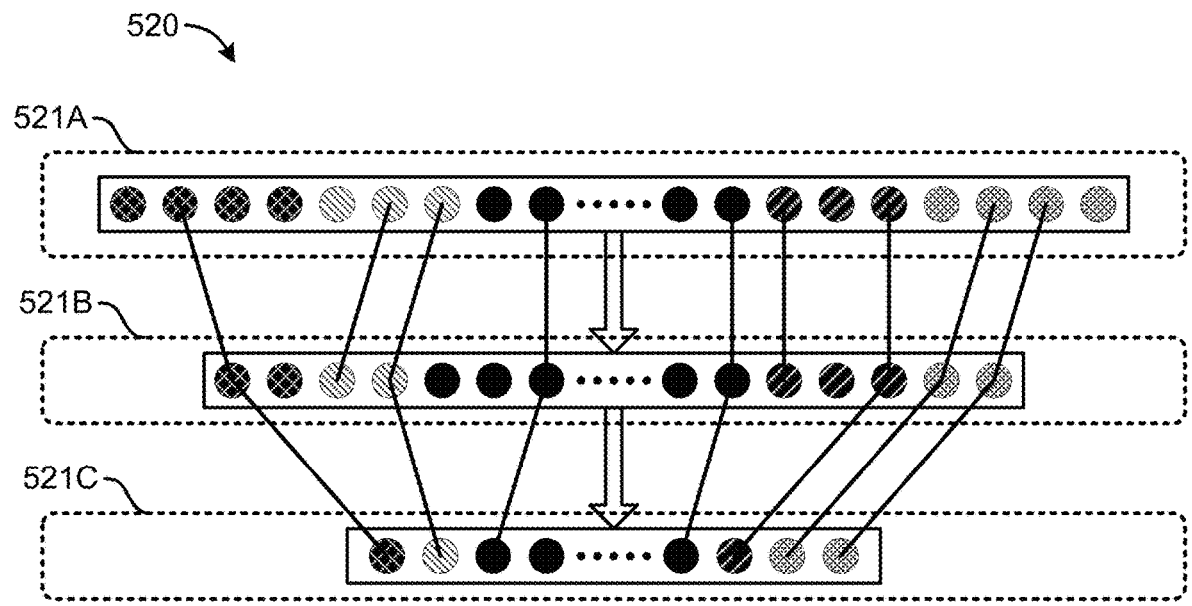
FIGS. 5A and 5B illustrate an example embodiment of a second-stage neural network (SSNN).
Figure 5B:
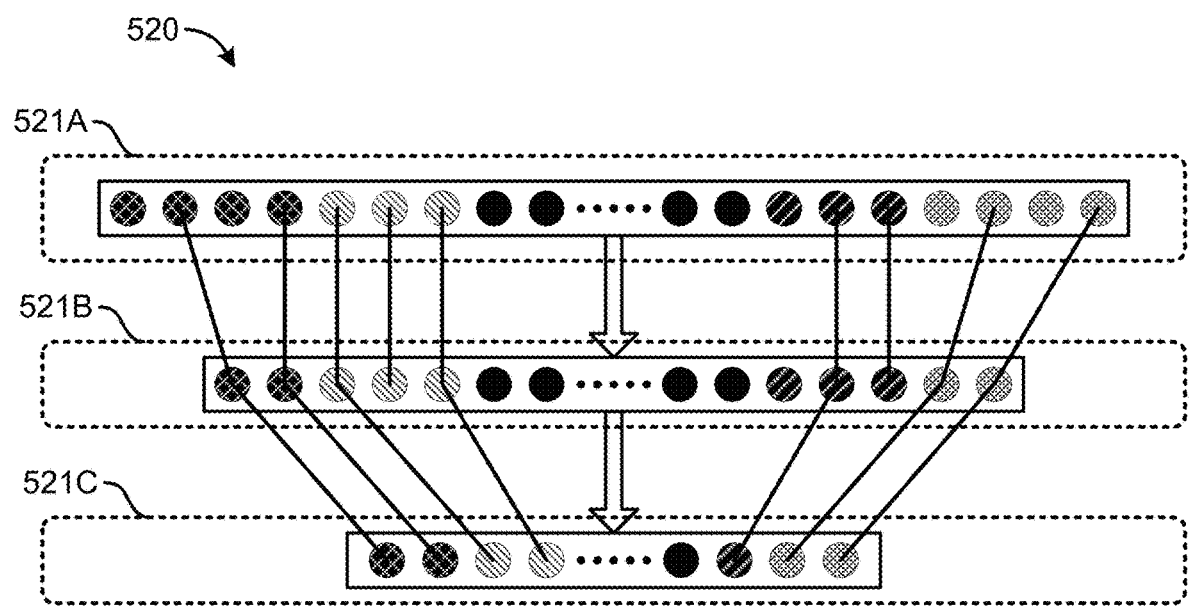

FIGS. 5A and 5B illustrate an example embodiment of a second-stage neural network (SSNN) 520. FIG. 5A shows the SSNN 520 before a training iteration, and FIG. 5B shows the SSNN 520 after the training iteration. This embodiment enforces a sparsity constraint on the SSNN 520. Thus, if only $W_{TEN}$ non-zero weights are allowed between the first layer 521A and the second layer 521B, then during the training iteration, some embodiments select only the $W_{TEN}$ highest nodes (which are represented by the lines that connect the nodes between the layers), and ignore the other nodes. As shown in FIGS. 5A and 5B, some of the non-zero weights may stay the same, and some of the non-zero weights may change.

Figure 6:
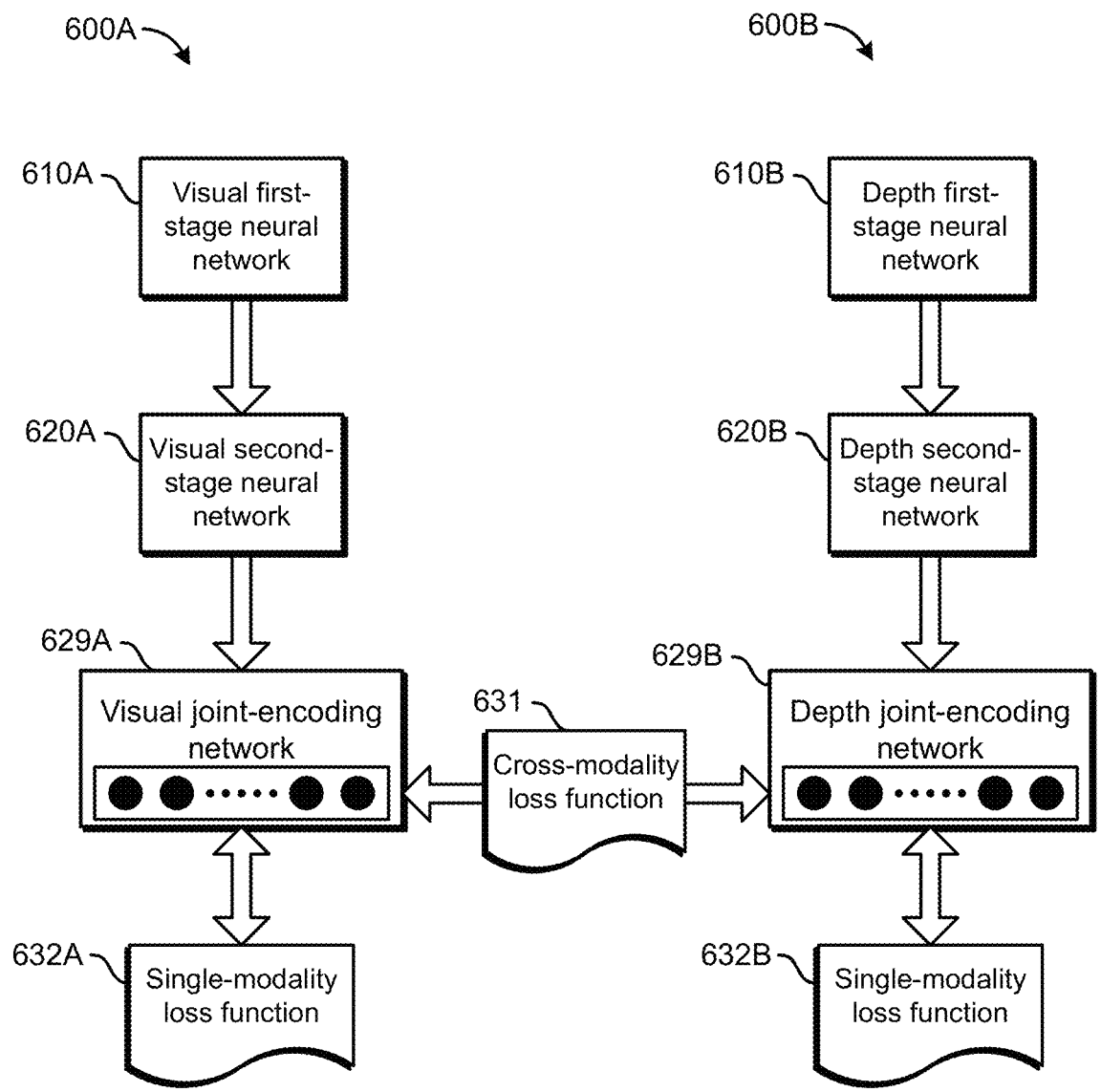
FIG. 6 illustrates an example embodiment of one or more neural networks that are trained with a cross-modality loss function.

FIG. 6 illustrates an example embodiment of one or more neural networks that are trained with a cross-modality loss function, which imposes a cross-modal constraint. In some embodiments, two different neural networks (e.g., two neural networks that are each specially-trained for a different modality) are trained. In other embodiments, two copies of the same neural network are used to train the neural network. Depending on the embodiment, the first neural network 600A and the second neural network 600B are different neural networks, or alternatively, the first neural network 600A and the second neural network 600B are copies of the same neural network.

The first neural network 600A includes a visual first-stage neural network 610A, a visual second-stage neural network 620A, and a visual joint-encoding network 629A. The second neural network 600B includes a depth first-stage neural network 610B, a depth second-stage neural network 620B, and a depth joint-encoding network 629B. In the first neural network 600A and the second neural network 600B, the joint-encoding networks 629A-B apply the cross-modality loss function 631. However, in some embodiments (e.g., the embodiments in FIGS. 7 and 8), the cross-modality loss function 631 is applied by the second-stage neural networks 620A-B.

The cross-modality loss function 631 imposes a cross-modal constraint. For example, some cross-modal constraints are based on pairwise-ranking distance, Euclidean distance, or cross entropy. The cross-modal constraint can be described according to the following:

$$\min\left(\sum_{m=1}^{M}(L_m(f_m(W_m, X_m), Y_m) + \lambda_m|W_{m-TEN}|) + \alpha\sum_{i=1}^{M}\sum_{j=1}^{M}cL(f_i(W_i, X_i), f_j(W_j, X_j))\right), \quad (3)$$

where the subscripts m, i, and j indicate different modalities of data, and where α is the balancing coefficient for the constraint.

Also, in this example embodiment, the first neural network 600A and the second neural network 600B are trained using the single-modality loss functions 632A-B in addition to the cross-modality loss function 631.

Figure 7:
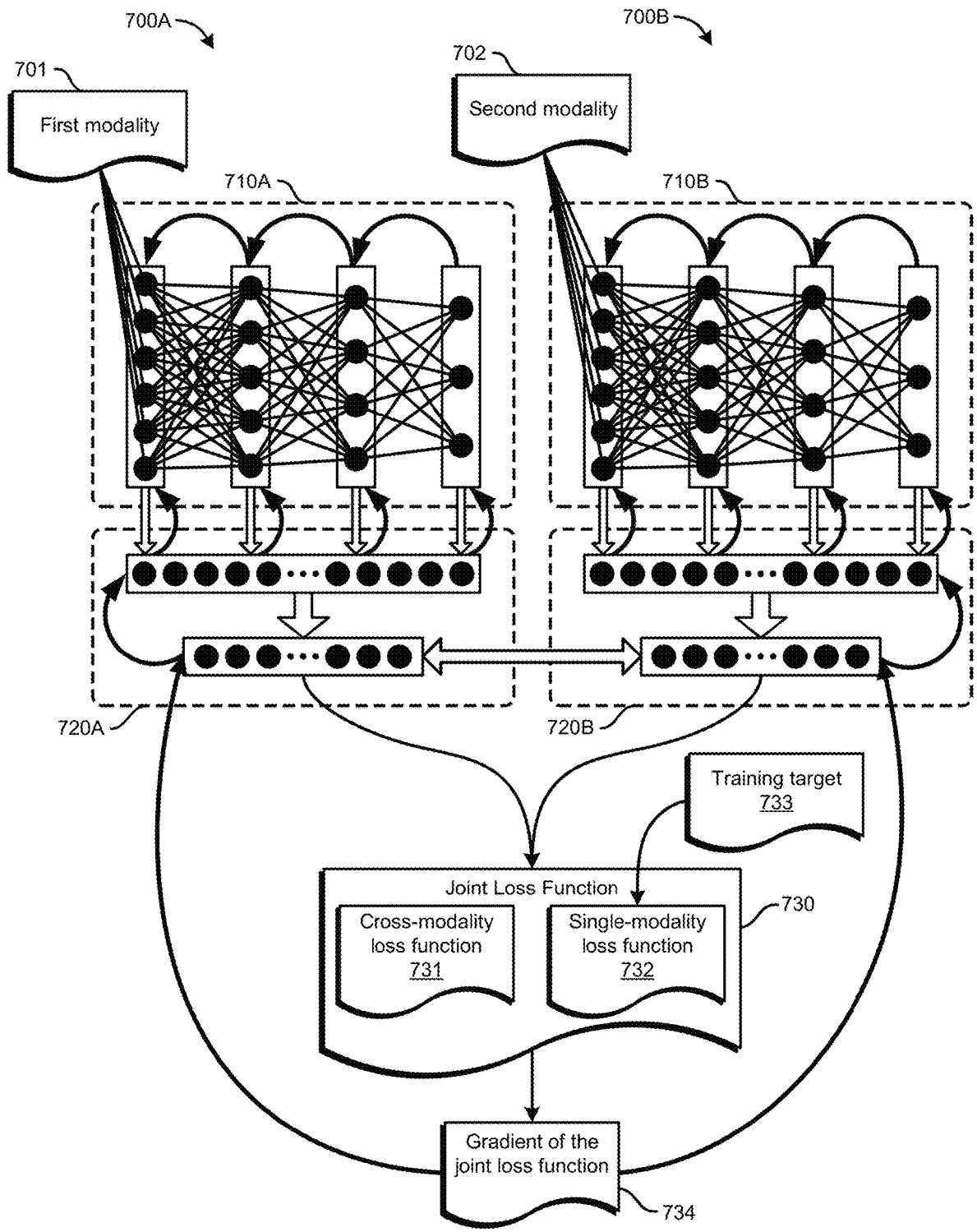
FIG. 7 illustrates an example embodiment of one or more neural networks that are trained with a cross-modality loss function.

FIG. 7 illustrates an example embodiment of one or more neural networks that are trained with a cross-modality loss function. In some embodiments, two different neural networks (e.g., two neural networks that are each specially-trained for a different modality) are trained. In other embodiments, two copies of the same neural network are used to train the neural network. Depending on the embodiment, the first neural network 700A and the second neural network 700B are different neural networks, or alternatively, the first neural network 700A and the second neural network 700B are copies of the same neural network.

Data of a first modality 701 are input to the first neural network 700A and fed forward (forward propagated) through the first neural network 700A, which includes a respective first-stage neural network 710A and a respective SSNN 720A. Also, data of a second modality 702 are input to the second neural network 700B and fed forward through the second neural network 700B, which includes a respective first-stage neural network 710B and a respective SSNN 720B. Furthermore, the data of the first modality 701 and the data of the second modality 702 may be paired.

The outputs of the first neural network 700A, the outputs of the second neural network 700B, and a training target 733 are input to a joint loss function 730 to generate a gradient of the joint loss function 734 (gradient 734). The joint loss function 730 includes a cross-modality loss function 731 and one or more single-modality loss functions 732, each of which accepts a training target 733 as an input. However, some embodiments do not use the training target 733 and the single-modality loss function 732.

The gradient 734 is then backpropagated through one or both of the first neural network 700A and the second neural network 700B, and one or both of the first neural network 700A and the second neural network 700B are updated.

A system, device, or method may perform multiple training iterations on the first neural network 700A and the second neural network 700B, and, in each of the training iterations, data of different modalities (either paired or unpaired) are input to the two neural networks 700A-B, and a pair of outputs is generated. Also, in embodiments in which the first neural network 700A and the second neural network 700B are different neural networks, the update operations may generate two updated neural networks 700A-B, one neural network per modality. And in embodiments in which the first neural network 700A and the second neural network 700B are copies of the same neural network, one of the updated first neural network 700A and the updated second neural network 700B may be selected as the updated neural network.

Figure 8:
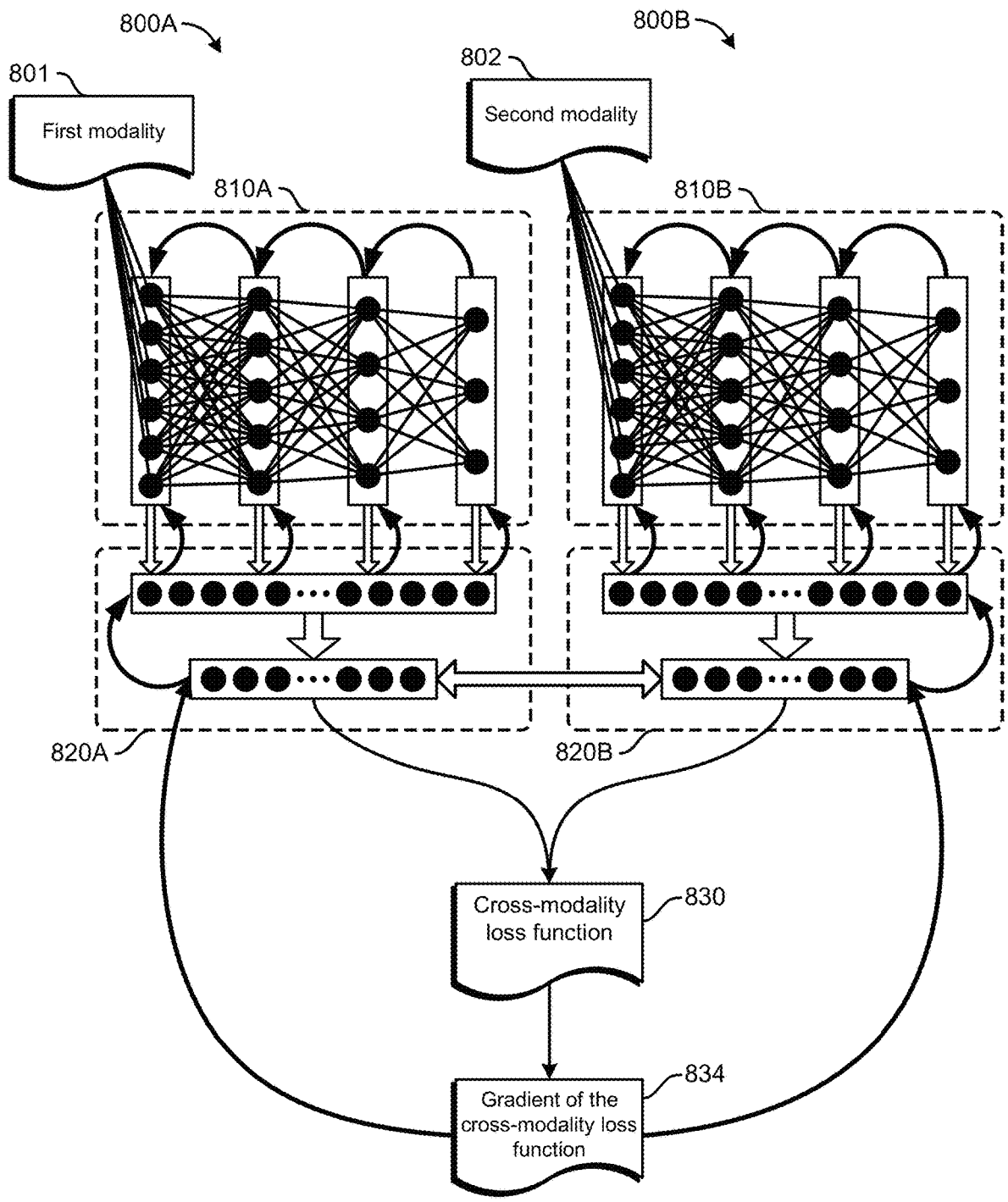
FIG. 8 illustrates an example embodiment of one or more neural networks that are trained with a cross-modality loss function.

FIG. 8 illustrates an example embodiment of one or more neural networks that are trained with a cross-modality loss function. Data of a first modality 801 are input to a first neural network 800A and fed forward (forward propagated) through the first neural network 800A, which includes a respective first-stage neural network 810A and a respective SSNN 820A. Also, data of a second modality 802 are input to a second neural network 800B and fed forward through the second neural network 800B, which includes a respective first-stage neural network 810B and a respective SSNN 820B. Furthermore, the data of the first modality 801 and the data of the second modality 802 may be paired.

The outputs of the first neural network 800A and the outputs of the second neural network 800B are input to a cross-modality loss function 830 to generate a gradient of the cross-modality loss function 834 (gradient 834), for example as described in equation (3).

The gradient 834 is then backpropagated through one or both of the first neural network 800A and the second neural network 800B, and one or both of the first neural network 800A and the second neural network 800B are updated. Thus, two updated neural networks may be generated: one neural network for the first modality, and another neural network for the second modality.

Figure 9:
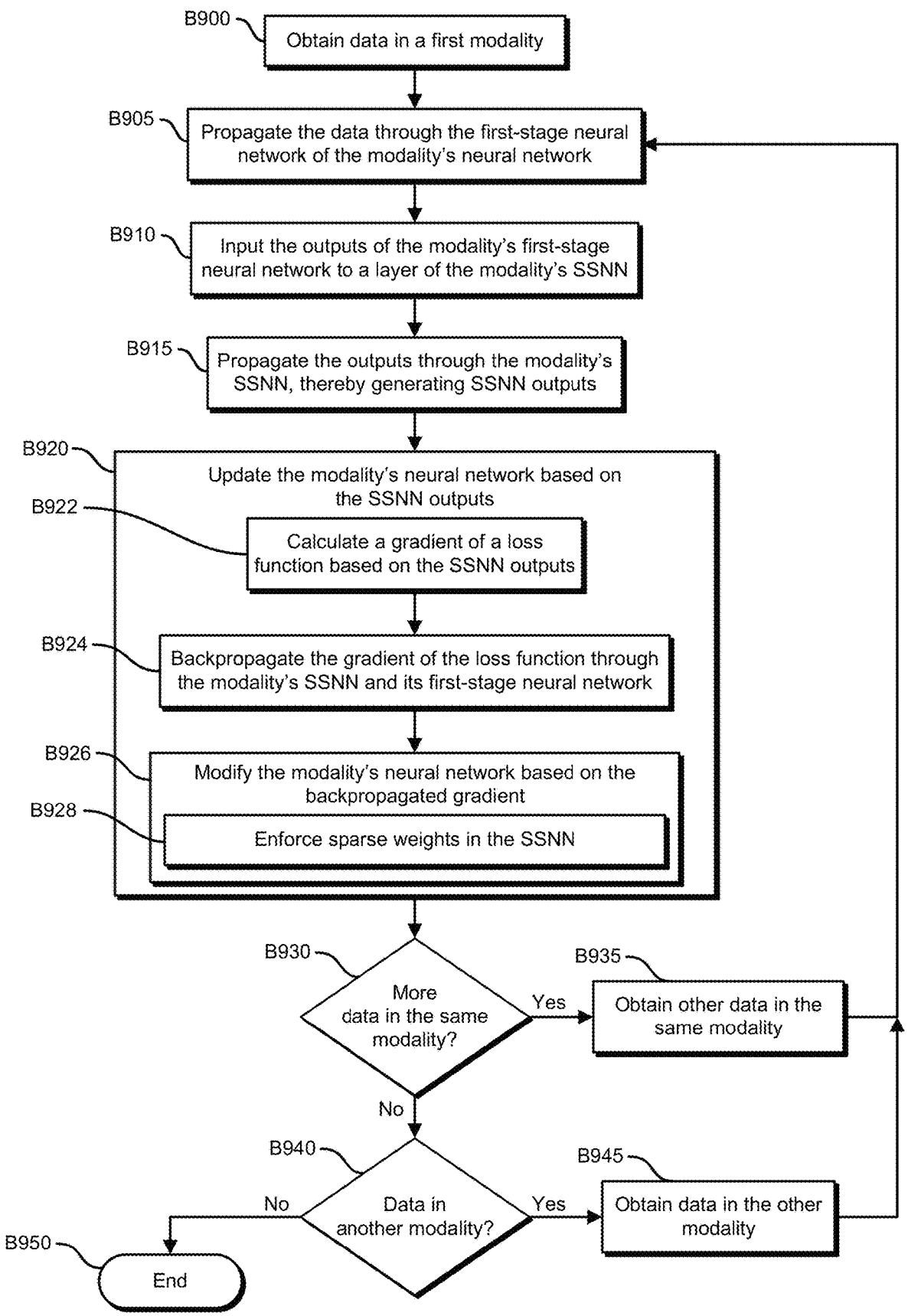
FIG. 9 illustrates an example embodiment of an operational flow for training a neural network.

FIG. 9 illustrates an example embodiment of an operational flow for training a neural network. Although this operational flow and the other operational flows that are described herein are each presented in a certain order, some embodiments of these operational flows may perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks, add blocks, change the order of the blocks, combine blocks, or divide blocks into more blocks.

Furthermore, although this operational flow and the other operational flows that are described herein are performed by a neural-network-generation device, other embodiments of these operational flows may be performed by two or more neural-network-generation devices or by one or more other specially-configured computing devices.

The flow starts in block B900, where a neural-network-generation device obtains data (e.g., a sample) in a first modality. Next, in block B905, the neural-network-generation device forward propagates the data through the modality's first-stage neural network. For example, in the first iteration of block B905, if a neural network is being trained specifically for the modality, then the modality's first-stage neural network is the first-stage neural network of the neural network that is being trained for the first modality. If a neural network is being trained for multiple modalities, then the modality's first-stage neural network is the first-stage neural network of a copy of the neural network that is being trained.

The flow then moves to block B910, where the neural-network-generation device inputs the outputs of the modality's first-stage neural network to a layer of the modality's second-stage neural network (SSNN). For example, in the first iteration of block B910, if a neural network is being trained specifically for the modality, then the modality's SSNN is the SSNN of the neural network that is being trained for the first modality. If a neural network is being trained for multiple modalities, then the modality's SSNN is the SSNN of a copy of the neural network that is being trained.

Then, in block B915, the neural-network-generation device forward propagates the first-stage neural network's outputs through the modality's SSNN, thereby generating outputs of the second-stage neural network (SSNN outputs).

The flow then moves to block B920, where the neural-network-generation device updates the modality's neural network based on the SSNN outputs. In this embodiment, block B920 includes blocks B922-B928. In block B922, the neural-network-generation device calculates a gradient of a loss function based on the SSNN outputs. Next, in block B924, the neural-network-generation device backpropagates the gradient of the loss function through the modality's second-stage neural network and first-stage neural network. The flow then moves to block B926, where the neural-network-generation device modifies the modality's neural network based on the backpropagated gradient. This embodiment of block B926 includes block B928, in which the neural-network-generation device enforces sparse weights in the modality's second-stage neural network. In the embodiment shown in FIG. 9, in block B924 the neural-network-generation device calculates the changes that will be made to the second-stage neural network and the first-stage neural network, and in block B926 the neural-network-generation device makes the changes to the second-stage neural network and the first-stage neural network.

After block B920, the flow proceeds to block B930, where the neural-network-generation device determines if there are more data in the same modality. If yes (B930=Yes), then the flow moves to block B935, where the neural-network-generation device obtains other data (e.g., another sample) in the same modality, and then the flow returns to block B905.

If not (B930=No), then the flow moves to block B940. In block B940, the neural-network-generation device determines if data in another modality (e.g., a second modality) are available. If yes (B940=Yes), then the flow moves to block B945, where the neural-network-generation device obtains data (e.g., a sample) in the other modality, and then the flow returns to block B905. If not (B940=No), then the flow moves to block B950, where the flow ends.

Figure 10:
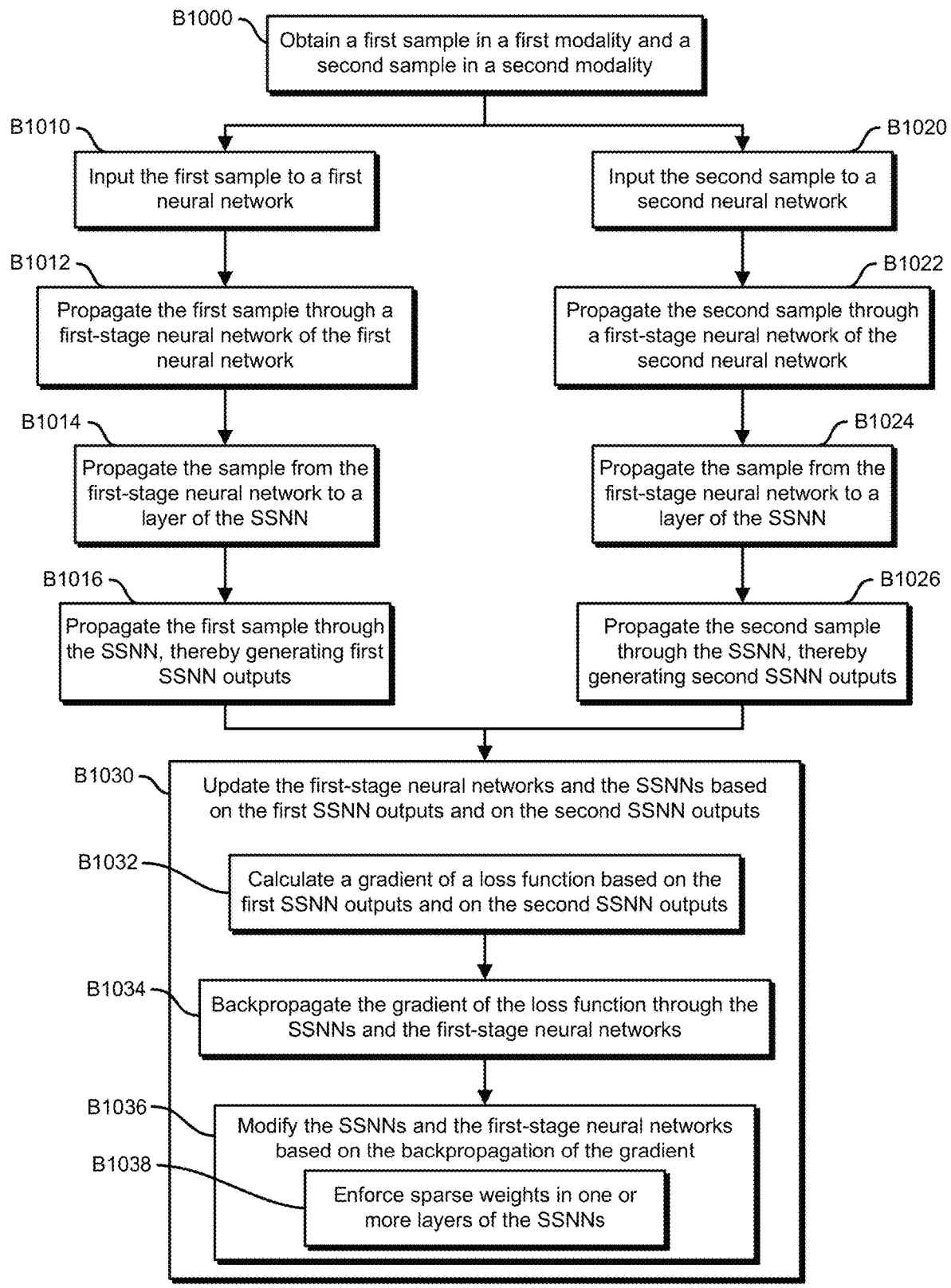
FIG. 10 illustrates an example embodiment of an operational flow for training a neural network.

FIG. 10 illustrates an example embodiment of an operational flow for training a neural network. The flow starts in block B1000, where a neural-network-generation device obtains a first sample, which is in a first modality (e.g., an RGB image), and a second sample, which is in a second modality (e.g., a depth image). The flow then splits into a first flow and a second flow.

The first flow moves to block B1010, where the neural-network-generation device inputs the first sample to a first neural network. The first neural network includes a first-stage neural network and a second-stage neural network (SSNN). The first flow then moves to block B1012, where the neural-network-generation device forward propagates the first sample through the first-stage neural network of the first neural network. Next, in block B1014, the neural-network-generation device forward propagates the sample from the first-stage neural network to a layer of the SSNN of the first neural network. The first flow then proceeds to block B1016, where the neural-network-generation device forward propagates the first sample through the SSNN, thereby generating first SSNN outputs. The first flow then moves to block B1030.

From block B1000, the second flow moves to block B1020, where the neural-network-generation device inputs the second sample to a second neural network. The second neural network includes a first-stage neural network and a second-stage neural network (SSNN). The second flow then moves to block B1022, where the neural-network-generation device forward propagates the second sample through the first-stage neural network of the second neural network. Next, in block B1024, the neural-network-generation device forward propagates the sample from the first-stage neural network to a layer of the SSNN of the second neural network. The second flow then proceeds to block B1026, where the neural-network-generation device forward propagates the second sample through the SSNN of the second neural network, thereby generating second SSNN outputs. The second flow then moves to block B1030.

In block B1030, the neural-network-generation device updates the first-stage neural network of the first neural network, the SSNN of the first neural network, the first-stage neural network of the second neural network, and the SSNN of the second neural network based on the first SSNN outputs and on the second SSNN outputs. In this embodiment, block B1030 includes blocks B1032-B1038. In block B1032, the neural-network-generation device calculates a gradient of a loss function (e.g., a joint loss function, such as a cross-modality loss function) based on the first SSNN outputs and on the second SSNN outputs. Then, in block B1034, the neural-network-generation device backpropagates the gradient of the loss function through the first-stage neural networks and the SSNNs. Next, in block B1036, the neural-network-generation device modifies the first-stage neural networks and the SSNNs based on the backpropagation of the gradient. Block B1036 may also include block B1038, in which the neural-network-generation device enforces sparse weights in one or more layers of the SSNNs, for example between a respective layer of the SSNNs and their respective first-stage neural network or between the respective layers of the SSNNs.

Furthermore, in some embodiments the neural-network-generation device then selects one of the modified first neural network and the modified second neural network as a new neural network for both modalities. Also, in some embodiments, the neural-network-generation device retains both modified neural networks. Thus, some embodiments specially train a neural network for one modality and specially train another neural network for another modality.

Figure 11:
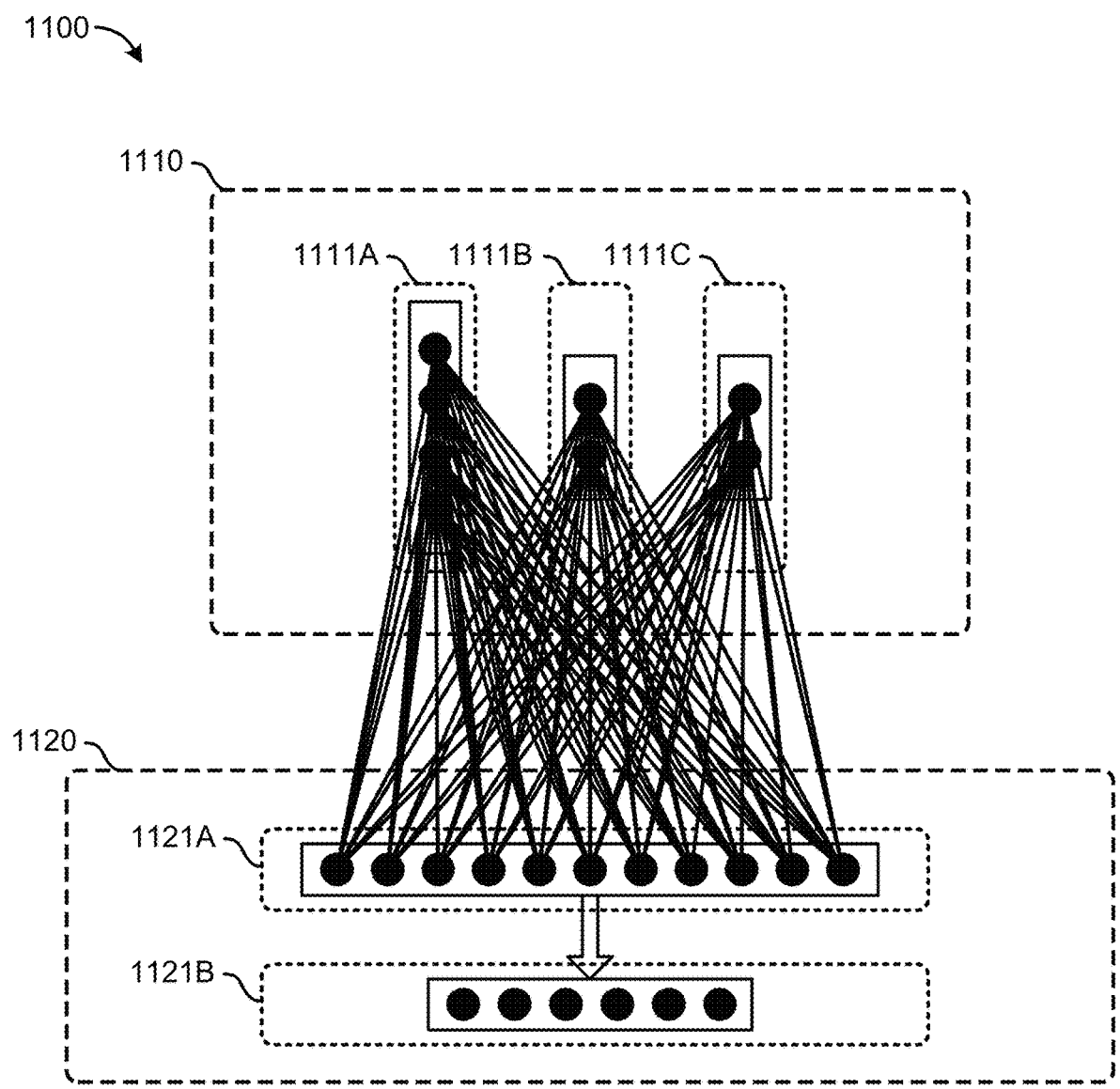
FIG. 11 illustrates an example embodiment of a neural network.

FIG. 11 illustrates an example embodiment of a neural network 1100. The neural network 1100 includes a first-stage neural network 1110 and a SSNN 1120. The first-stage neural network 1110 includes three layers: a first layer 1111A, a second layer 1111B, and a third layer 1111C. The SSNN 1120 includes two layers: a first layer 1121A and a second layer 1121B. FIG. 11 shows the connections between the first-stage neural network 1110 and the first layer 1121A of the SSNN 1120. In this example embodiment, the first-stage neural network 1110 is fully connected to the first layer 1121A of the SSNN 1120.

Figure 12:
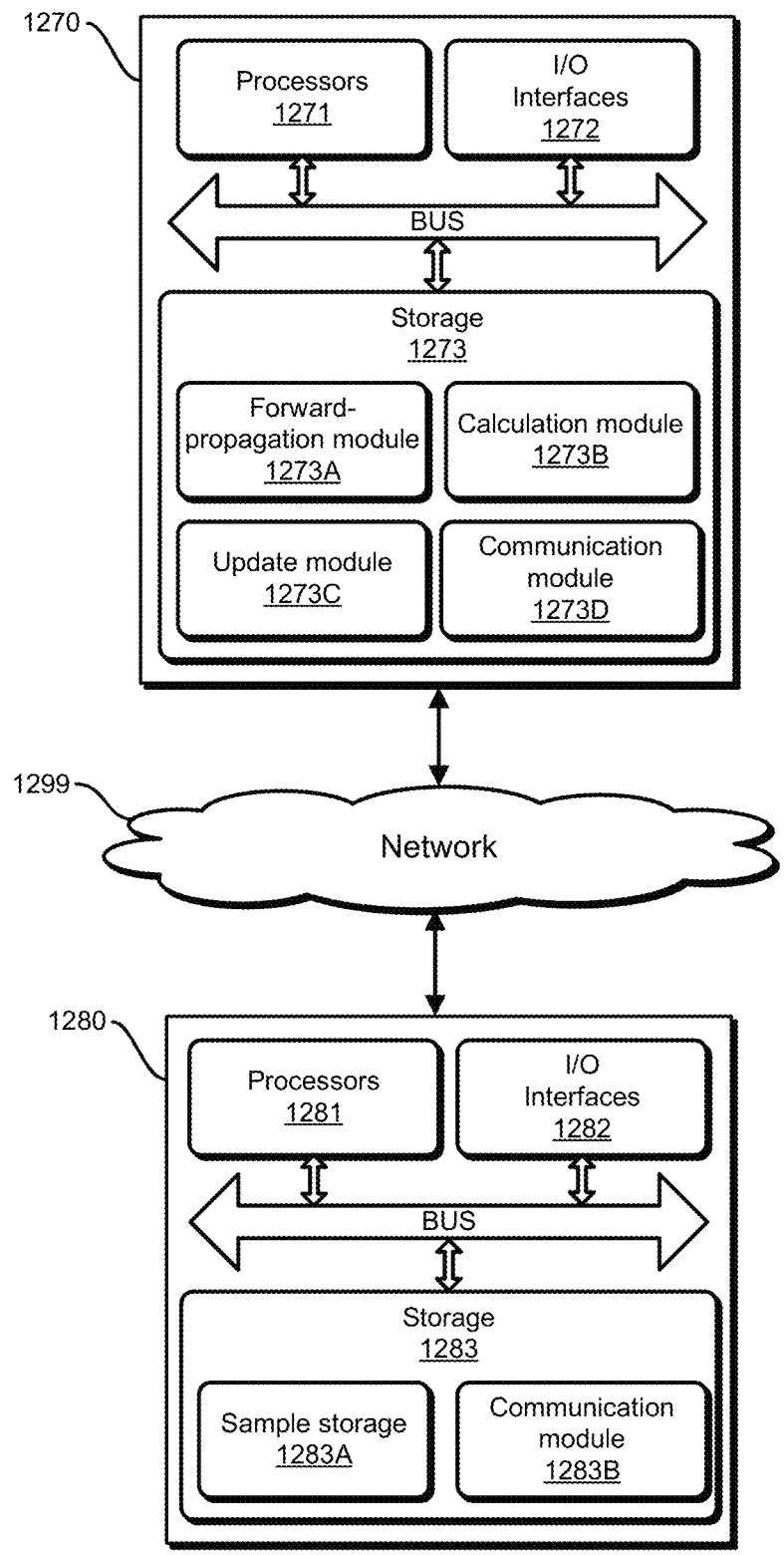
FIG. 12 illustrates an example embodiment of a system for training a neural network.

FIG. 12 illustrates an example embodiment of a system for training a neural network. The system includes a neural-network-generation device 1270 and a sample-storage device 1280. In this embodiment, the devices communicate by means of one or more networks 1299, which may include a wired network, a wireless network, a LAN, a WAN, a MAN, and a PAN. Also, in some embodiments the devices communicate by means of other wired or wireless channels.

The neural-network-generation device 1270 includes one or more processors 1271, one or more I/O interfaces 1272, and storage 1273. Also, the hardware components of the neural-network-generation device 1270 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1271 include one or more central processing units (CPUs), which include microprocessors (e.g., a single core microprocessor, a multi-core microprocessor); graphics processing units (GPUs); or other electronic circuitry. The one or more processors 1271 are configured to read and perform computer-executable instructions, such as instructions that are stored in the storage 1273. The I/O interfaces 1272 include communication interfaces to input and output devices, which may include a keyboard, a display, a mouse, a printing device, a touch screen, a light pen, an optical-storage device, a scanner, a microphone, a camera, a drive, a controller (e.g., a joystick, a control pad), and a network interface controller.

The storage 1273 includes one or more computer-readable storage media. As used herein, a computer-readable storage medium, in contrast to a mere transitory, propagating signal per se, refers to a computer-readable media that includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 1273, which may include both ROM and RAM, can store computer-readable data or computer-executable instructions.

The neural-network-generation device 1270 also includes a forward-propagation module 1273A, a calculation module 1273B, an update module 1273C, and a communication module 1273D. A module includes logic, computer-readable data, or computer-executable instructions, and may be implemented in software (e.g., Assembly, C, C++, C #, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 1273.

The forward-propagation module 1273A includes instructions that, when executed, or circuits that, when activated, cause the neural-network-generation device 1270 to obtain one or more samples, for example from the sample-storage device 1280; to obtain or generate a neural network; to select one or more samples (e.g., paired samples); and to forward propagate samples through the neural network to produce outputs. In some embodiments, this includes the operations of blocks B900-B915 in FIG. 9 or the operations of blocks B10000-B1026 in FIG. 10. Also, the forward-propagation module 1273A includes instructions that, when executed, or circuits that, when activated, cause the neural-network-generation device 1270 to obtain a query image and forward propagate the query image through the neural network, thereby producing representative features for the query image.

The calculation module 1273B includes instructions that, when executed, or circuits that, when activated, cause the neural-network-generation device 1270 to obtain or generate a loss function (e.g., a cross-modality loss function, a joint-loss function); to calculate a gradient of the loss function based on one or more outputs from one or more neural networks (e.g., a first copy of the neural network, a second copy of the neural network); and to adjust the loss function. In some embodiments, this includes the operations of block B922 in FIG. 9 or includes the operations of block B1032 of FIG. 10.

The update module 1273C includes instructions that, when executed, or circuits that, when activated, cause the neural-network-generation device 1270 to update a neural network, which includes backpropagating a gradient through the neural network. In some embodiments, this includes at least some of the operations of block B920 in FIG. 9 or at least some of the operations of block B1030 in FIG. 10. Also, the update module 1273C may call the calculation module 1273B.

The communication module 1273D includes instructions that, when executed, or circuits that, when activated, cause the neural-network-generation device 1270 to communicate with one or more other devices, for example the sample-storage device 1280.

The sample-storage device 1280 includes one or more processors 1281, one or more I/O interfaces 1282, and storage 1283, and the hardware components of the sample-storage device 1280 communicate by means of a bus. The sample-storage device 1280 also includes sample storage 1283A and a communication module 1283B. The sample storage 1283A includes one or more computer-readable storage media that are configured to store data of different modalities and store testing data. And the communication module 1283B includes instructions that, when executed, or circuits that, when activated, cause the sample-storage device 1280 to obtain data and store them in the sample storage 1283A, to receive requests for data (e.g., from the neural-network-generation device 1270), and to send data from the sample storage 1283A to other devices in response to received requests.

Some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A system comprising:
one or more computer-readable media; and
one or more processors that are coupled to the one or more computer-readable media and that are configured to cause the device to
obtain data in a first modality;
propagate the data in the first modality through a first neural network, thereby generating first network outputs,
wherein the first neural network includes a first-stage neural network and a second-stage neural network,
wherein the first-stage neural network includes two or more layers,
wherein each layer of the two or more layers of the first-stage neural network includes a plurality of respective nodes,
wherein the second-stage neural network includes two or more layers, one of which is an input layer and one of which is an output layer,
wherein each node in each layer of the first-stage neural network is connected to the input layer of the second-stage neural network, and
wherein the output layer of the second-stage neural network produces the first network outputs;
calculate a gradient of a loss function based on the first network outputs and on the loss function;
backpropagate the gradient of the loss function through the first neural network including backpropagating the gradient through the first neural network in the following order: from the output layer of the second-stage neural network to the input layer of the second-stage neural network, then from the input layer of the second-stage neural network to each layer of the first-stage neural network, and then from a deepest layer of the first-stage neural network to an input layer of the first-stage neural network; and
update the first neural network based on the backpropagation of the gradient.

2. The system of claim 1, wherein the one or more processors are further configured to cause the device to
obtain data in a second modality, wherein the second modality is different from the first modality;
propagate the data in the second modality through a second neural network, thereby producing second network outputs; and calculate the gradient of the loss function further based on the second network outputs,
wherein the loss function is a cross-modality loss function.

3. The system of claim 2, wherein the second neural network is a copy of the first neural network.

4. The system of claim 2, wherein the second neural network is different from the first neural network.

5. The system of claim 4, wherein the one or more processors are further configured to cause the device to
backpropagate the gradient of the loss function through the second neural network; and
update the second neural network based on the backpropagation of the gradient.

6. The system of claim 1, wherein the one or more processors are further configured to cause the device to
enforce a sparsity constraint between the first-stage neural network and the input layer of the second-stage neural network or between the two or more layers of the second-stage neural network.

7. The system of claim 1, wherein the first-stage neural network includes three or more layers.

8. One or more non-transitory computer-readable media storing computer-executable instructions that, when executed by one or more computing devices, cause the one or more computing devices to perform operations comprising:
obtaining data in a first modality;
propagating the data in the first modality through a first neural network, thereby generating first network outputs,
wherein the first neural network includes a first-stage neural network and a second-stage neural network,
wherein the first-stage neural network includes two or more layers, one of which is an input layer and one of which is a deepest layer,
wherein the second-stage neural network includes two or more layers, one of which is an input layer and one of which is a deepest layer, and
wherein each node in each layer of the first-stage neural network is connected to the input layer of the second-stage neural network;
calculating a gradient of a loss function based on the first network outputs and on the loss function;
backpropagating the gradient of the loss function through the first neural network, wherein backpropagating the gradient through the first neural network is performed in the following order: from the deepest layer of the second-stage neural network to the input layer of the second-stage neural network, then from the input layer of the second-stage neural network to each layer of the first-stage neural network, and then from the deepest layer of the first-stage neural network to the input layer of the first-stage neural network; and
updating the first neural network based on the backpropagation of the gradient.

9. The one or more non-transitory computer-readable media of claim 8, wherein the operations further comprise:
obtaining data in a second modality, wherein the second modality is different from the first modality; and
propagating the data in the second modality through a second neural network, thereby generating second network outputs,
wherein the loss function is a cross-modality loss function, and
wherein calculating the gradient of the loss function is further based on the second network outputs.

10. The one or more non-transitory computer-readable media of claim 9, wherein cross-modality loss function imposes a cross-modal constraint, and wherein the cross-modal constraint can be described by $$\min\left(\sum_{m=1}^{M} (L_m(f_m(W_m, X_m), Y_m) + \lambda_m |W_{m-TEN}|) + \alpha \sum_{i=1}^{M} \sum_{j=1}^{M} cL(f_i(W_i, X_i), f_j(W_j, X_j))\right),$$

where the subscripts m, i, and j indicate different modalities of data, and where α is the balancing coefficient for the constraint.

11. The one or more non-transitory computer-readable media of claim 9, wherein the data in the first modality and the data in the second modality are paired.

12. The one or more non-transitory computer-readable media of claim 11, wherein the data in the first modality are an RGB image of a scene, and wherein the data in the second modality are a depth image of the scene.

13. The one or more non-transitory computer-readable media of claim 8, wherein calculating the gradient of the loss function is further based on a training target.

14. A method comprising:
obtaining data in a first modality;
propagating the data in the first modality through a first neural network, thereby generating first network outputs,
wherein the first neural network includes a first-stage neural network and a second-stage neural network,
wherein the first-stage neural network includes two or more layers,
wherein each layer of the two or more layers of the first-stage neural network includes a plurality of respective nodes,
wherein the second-stage neural network includes two or more layers, one of which is an input layer and one of which is an output layer,
wherein each node in each layer of the first-stage neural network is connected to the input layer of the second-stage neural network, and
wherein the output layer of the second-stage neural network produces the first network outputs;
calculating a gradient of a loss function based on the first network outputs and on the loss function;
backpropagating the gradient of the loss function through the first neural network, wherein backpropagating the gradient includes backpropagating the gradient from the input layer of the second-stage neural network to each layer of the first-stage neural network, and then backpropagating the gradient from a second layer of the two or more layers of the first-stage neural network to a first layer of the two or more layers of the first-stage neural network; and
updating the first neural network based on the backpropagation of the gradient.

15. The method of claim 14, further comprising:
obtaining data in a second modality, wherein the second modality is different from the first modality; and
propagating the data in the second modality through a second neural network, thereby producing second network outputs, wherein calculating the gradient of the loss function is further based on the second network outputs.

16. The method of claim 15, wherein the loss function includes a cross-modality loss function and a single-modality loss function.

17. The method of claim 16, wherein calculating the gradient of the loss function is further based on a training target.

18. The method of claim 14, wherein updating the first neural network based on the backpropagation of the gradient includes enforcing a sparsity constraint between the first-stage neural network and the input layer of the second-stage neural network or between the two or more layers of the second-stage neural network.

* * * * *